Aug. 18, 1931. A. L. POE 1,819,000
BICYCLE LOCK
Original Filed Nov. 19, 1929 3 Sheets-Sheet 2

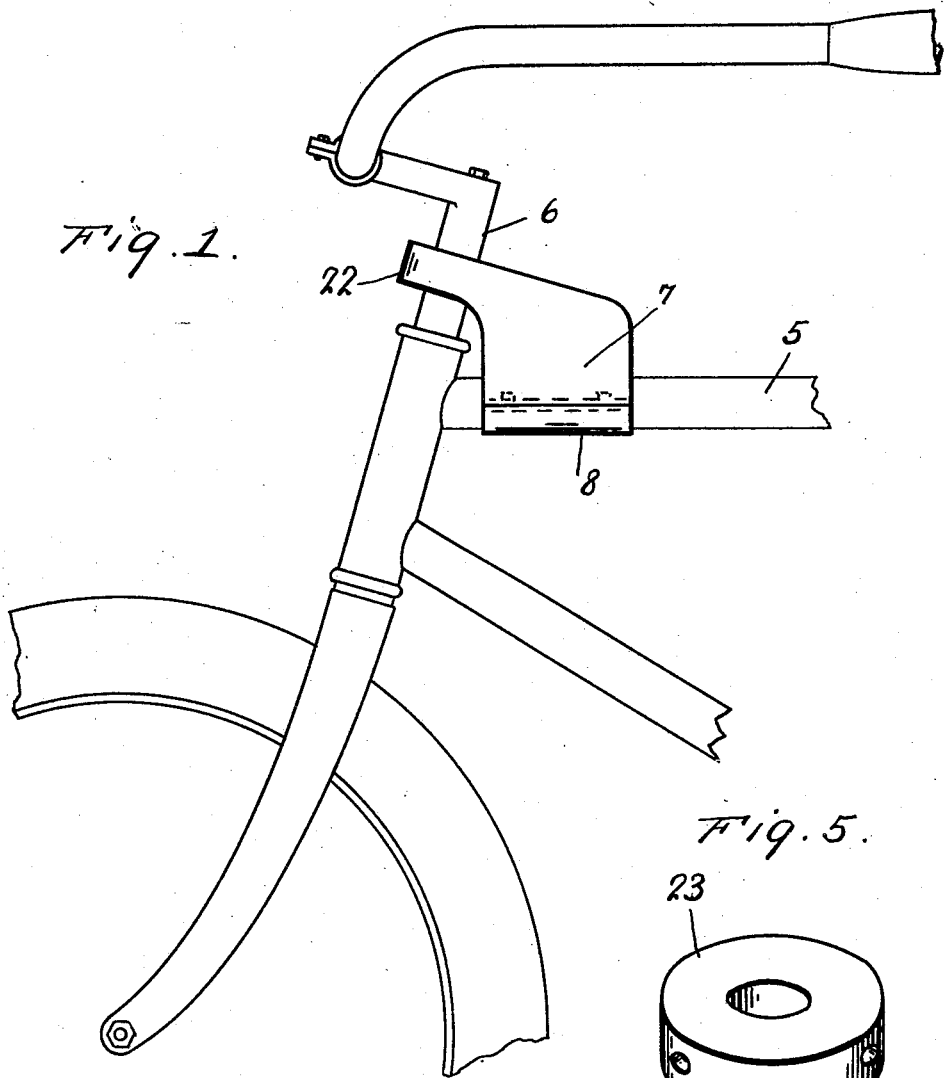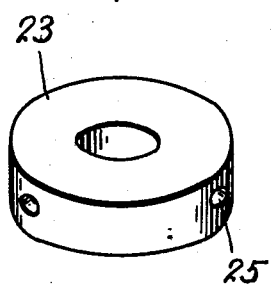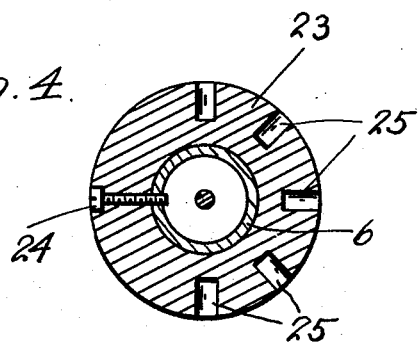

Inventor
Alfred L. Poe
By Clarence A. O'Brien
Attorney

Aug. 18, 1931.   A. L. POE   1,819,000
BICYCLE LOCK
Original Filed Nov. 19, 1929   3 Sheets-Sheet 3

Inventor
Alfred L. Poe

By Clarence A. O'Brien
Attorney

Patented Aug. 18, 1931

1,819,000

UNITED STATES PATENT OFFICE

ALFRED L. POE, OF JACKSONVILLE, FLORIDA

BICYCLE LOCK

Application filed November 19, 1929, Serial No. 408,290. Renewed June 26, 1931.

The present invention relates to a lock for bicycles and has for its prime object to provide a lock which is handy, compact and convenient in its structure, easy to manipulate, not likely to rattle, comfortable, inexpensive to manufacture, strong and durable, thoroughly efficient and reliable in use, and otherwise well adapted for the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a fragmentary side elevation of the front end of a bicycle showing my improved lock thereon.

Figure 4 is a detail sectional view through the collar.

Figure 5 is a perspective view of the collar.

Figure 2:
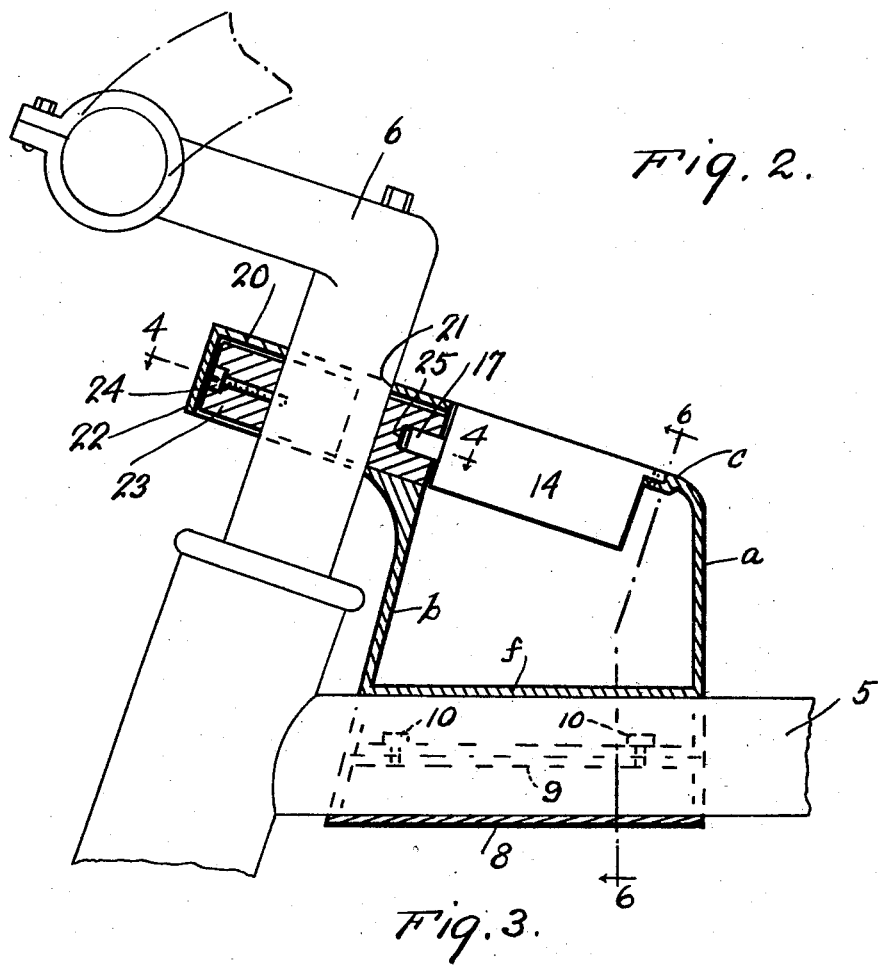
Figure 2 is a vertical section therethrough.
Figure 3:
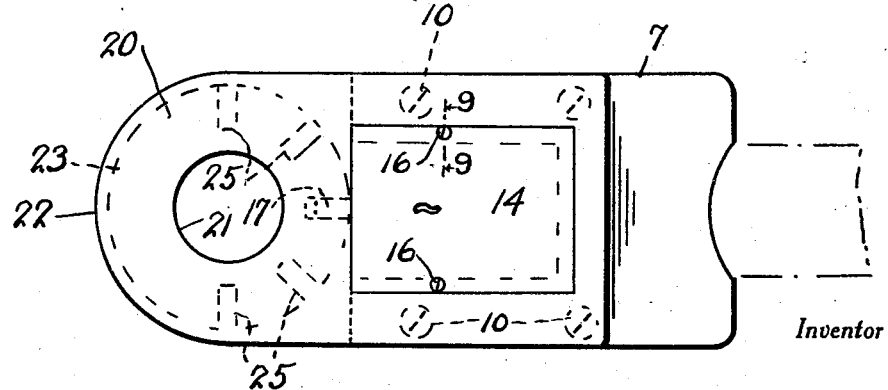
Figure 3 is a top plan view thereof.
Figure 6:
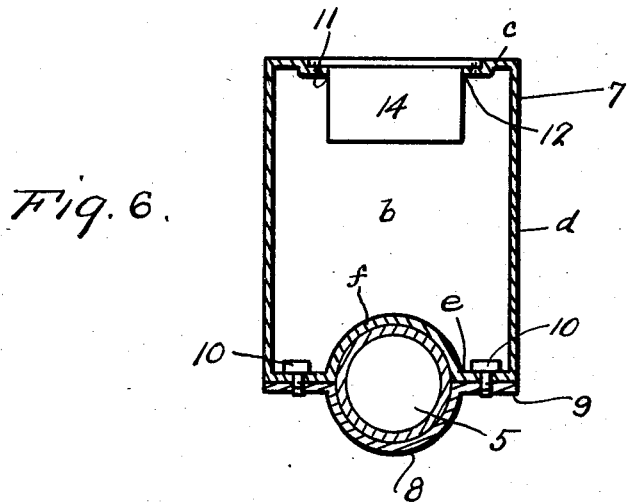
Figure 6 is a sectional view taken substantially on the line 6—6 of Figure 2.
Figure 7:
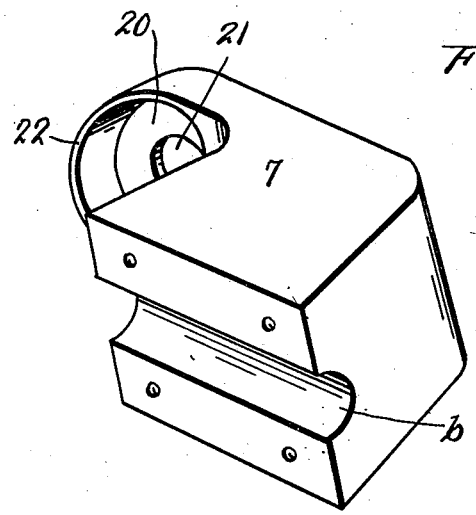
Figure 7 is a perspective view of the frame casing.
Figure 9:
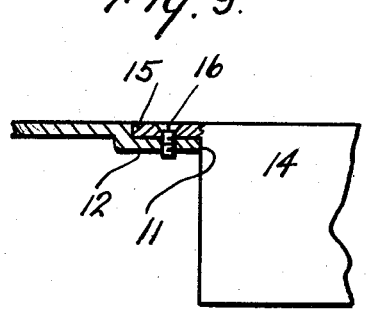
Figure 9 is an enlarged detail sectional view, taken substantially on the line 9—9 of Figure 3.
Figure 8:
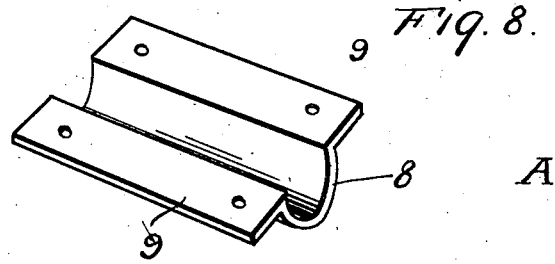
Figure 8 is a perspective view of the clamp plate for association therewith.

Referring to the drawings in detail, it will be seen that the numeral 5 denotes the top horizontal bar of a bicycle and the numeral 6 the handle bar post. The parts are of course conventional and have been shown merely for the purpose of exemplifying the utility and advantages of my improved lock structure.

The numeral 7 denotes a frame casing which comprises a rear wall $a$, a front inclined wall $b$, a top wall $c$, a bottom wall $e$ and side walls $d$. The bottom wall $e$ is provided with a semi-cylindrical central portion $f$, which rests on top of the bar 5, and is held in engagement therewith by a cylindrical clamp plate 8 having side ears 9, fixed to the bottom $e$ by screws 10, the heads of which are located interiorly of the frame casing. The top wall $c$ is formed with a counter-sunk opening 11 to form a ledge 12, so that a block 14 with flanges 15 rests thereon and may be screwed in place as at 16. This lock 14 includes a bolt 17 of the key actuated type. A hood 20 projects from the frame casing and has an opening 21 through which the post 6 projects. A depending skirt or flange 22 is provided on the hood 20. A collar 23 is fixed to the post 6 by means of a screw 24, the head of which is countersunk and this collar 23 is located in the hood 20 so that access cannot be had to the counter-sunk screw 24. This collar is provided with a plurality of spaced pockets 25, into which the bolt 17 may project to prevent steering of the bicycle as will be quite apparent.

From the above detailed description, it will be seen that the collar 23 is first placed on the post 6 and the post 6 is inserted through the opening 21, after the frame casing has been clamped to the bar 5, and thus the casing may be raised so as to allow the collar to be fastened in place at the desired height and then the frame casing may be lowered to place the hood over the collar and the frame casing securely clamped to the bar 5.

The lock 14 may then be assembled in place and this lock structure is then ready for use. It is thought that the construction, operation, utility and advantages will now be quite apparent to those skilled in this art, without a more detailed description thereof. The present embodiment of the invention has been disclosed in considerable detail, merely for the purposes of exemplification, since in actual practice it attains the features of advantage enumerated as desirable in the statement of the invention and the above description. It will be apparent that changes in the details of construction and in the combination and arrangement of parts may be resorted to, without departing from the spirit of the invention or the scope of the appended claim.

What is claimed is:

A lock structure of the class described comprising a frame, means for securing the frame on the horizontal bar of the bicycle, a collar, means for securing the collar on the handle bar post of the bicycle, said frame having a hood extending over the collar, said collar being formed with a plurality of notches, a lock fixed in said frame and having a bolt extending into one of said notches, said frame being in the nature of a casing having a bottom wall, a portion of which is semi-cylindrical to fit over the horizontal bar, the means for clamping the frame in place comprising a semi-cylindrical plate to extend under the bar and having side ears, and screws threaded from the interior of the casing through the bottom thereof into said ears to hold the clamp plate in place with the casing on the horizontal bar.

In testimony whereof I affix my signature.

ALFRED L. POE.